United States Patent
Gerardo

(10) Patent No.: US 6,572,058 B1
(45) Date of Patent: Jun. 3, 2003

(54) MULTIPLE CABLE SUPPORT BRACKET

(75) Inventor: Joseph R. Gerardo, Victorville, CA (US)

(73) Assignee: Fabworks, LLC, Santa Ana, CA (US)

( * ) Notice: Subject to any disclaimer, the term of this patent is extended or adjusted under 35 U.S.C. 154(b) by 0 days.

(21) Appl. No.: 10/074,831

(22) Filed: Feb. 12, 2002

(51) Int. Cl.$^7$ ................................................. F16L 3/10
(52) U.S. Cl. ........................... 248/74.2; 24/563; 248/73
(58) Field of Search ........................ 248/65, 67.7, 68.1, 248/73, 74.1, 74.2, 316.7, 300; 24/482, 530, 545, 563

(56) References Cited

U.S. PATENT DOCUMENTS

| | | | |
|---|---|---|---|
| 2,712,917 A | * 7/1955 | Flora et al. | ................. 403/397 |
| 3,019,954 A | * 2/1962 | Faltin | ......................... 224/483 |
| 3,536,281 A | * 10/1970 | Meehan et al. | ............... 248/73 |
| 3,894,706 A | * 7/1975 | Mizusawa | .................. 248/68.1 |
| 4,560,126 A | * 12/1985 | Judkins et al. | ................ 248/72 |
| 4,878,639 A | * 11/1989 | Tempco | ....................... 248/73 |
| 4,932,625 A | * 6/1990 | Hotchkiss, Jr. | .......... 248/316.7 |
| 5,188,318 A | * 2/1993 | Newcomer et al. | ........ 248/68.1 |
| 5,312,029 A | * 5/1994 | Tuber | ......................... 224/679 |

OTHER PUBLICATIONS

U.S. patent application Publication No. 2001/0006208, Benito–Navazo, Pub. Date: Jul. 5, 2001, filed Dec. 8, 2000.*

* cited by examiner

*Primary Examiner*—Ramon O. Ramirez
*Assistant Examiner*—Jon Szumny
(74) *Attorney, Agent, or Firm*—Mayer Brown Rowe & Maw

(57) ABSTRACT

An improved wire and/or cable support member provides simultaneous support for a plurality of wires and/or cable members. A first portion of the support member includes a bracket portion that is preferably configured to have a vertical orientation. The first bracket portion desirably includes one or more openings through which screws, bolts or nails may be driven to secure the bracket to an adjacent structure. A cable support arm extends outward from the bracket portion. This portion also has a further portion which extends parallel to the bracket portion and a further segment which extends back toward the bracket portion to form a cavity within which one or more cables and/or wires may be located. The preferred bracket support of the present invention also preferably includes a centrally located spacer arm that may be utilized to provide further support for wires and/or cables located with in the cavity formed by the support arm while also separating the various cables and/or wires located with in the support member.

9 Claims, 3 Drawing Sheets

MULTIPLE CABLE SUPPORT BRACKET

BACKGROUND OF THE INVENTION

1. Field of the Invention

The present invention relates generally to the field of electrical cable and wire support brackets and devices. More specifically, the present invention is directed to an improved cable support member that includes a central support portion for preventing cables supported by the bracket from becoming entangled with one another.

2. Description of the Related Art

As a result of the tremendous growth in the telecommunications and electronics industry, there has been a dramatic increase in the number of electrical cables and wires that are installed and routed in buildings both above and below ceilings as well as between wall cavity spaces. Safety considerations as well as many existing building codes dictate that these wires and cables be supported at regular intervals.

There are currently a wide variety of cable supporting brackets and devices available in the prior art. The majority of these devices provide some supporting contact point for connection to either an overhead support or wall support in order to provide vertical support for the cable. Typical conventional cable support designs include, for example, such things as U or J-shaped members that include holes in a side portion for securing the cable support to an adjacent wall or ceiling member. Other prior art solutions include simple wire members or hangers that provide a convenient loop for securing one or more cables and/or wires.

One shortcoming of existing cable support designs is that currently there is no known cable supporting bracket or device that is available for supporting multiple cables while also preventing undesired entanglement of the cables within the support or bracket. For example, one such design of the prior art is shown generally at 10 in FIG. 1.

As shown in FIG. 1, the cable support 12 of the prior art is comprised of a hook or j-shaped member 12 that includes centrally located holes 14 in an upper portion thereof for securing the cable support mechanism to an adjacent wall or ceiling or related supporting structure. In this prior art cable support design electrical wires or cables are inserted into the trough of the j-shaped member where they may be supported by the bottom and side walls of the trough. Multiple cables or wires may be inserted into this space to thereby provide support for these cables. In this design, a further cable securing member is removably inserted into an opening formed at the end of the j-shaped member. The cable securing member prevents wires and cables from inadvertently being displaced from the trough.

Accordingly, with this design, both wires and cables may be secured within the trough of the j-shaped member. The location of the wires and/or cables ensures that the wires and/or cables do not inadvertently become dislodged from their desired position. One shortcoming of this existing design as well as other prior art designs that provide a common trough location is that the cables and wires located within the cable support member may be undesirably overlapped or otherwise entangled with one another. This can result in confusion or difficulty in accessing the particular one of the cables located within the cable support member. There are currently no known support members for supporting multiple cables and/or wires from either a horizontal or vertical location which also provide the ability to prevent the undesired entanglement of the cables and/or wires located within the support bracket.

Thus, there remains a need in the art for an improved cable support which provides support for one or more cables and/or wires on either a horizontal or vertical surface wherein the cables and/or wires located and secured within the support are not susceptible to becoming entangled with one another. Accordingly, one object of the present invention is to provide a cable supporting bracket that advantageously is capable of securing multiple cables and/or wires to an adjacent support while also ensuring that the cables do not become entangled with one another. Another object and advantage of the present invention is to provide a cable supporting bracket or device that allows a user to easily insert multiple cables and/or wires into the bracket. Another object and advantage of the present invention is to provide a cable supporting bracket or device that allows a user to readily identify and access a selected one of multiple wires and/or cables located within the supporting bracket. Another object and advantage of the present invention is to provide an improved cable support mechanism which can be easily secured so that cables located or supported by the support bracket will not inadvertently become dislodged from the support member.

Other objects and advantages of the present invention will become apparent and follow, in light of the following Summary and Detailed Description of the Presently Preferred Embodiments.

SUMMARY OF THE INVENTION

The present invention relates generally to the field of electrical support brackets. More specifically, the present invention is directed to an improved electrical cable support member which is capable of supporting multiple electrical cables while also ensuring that the cables do not become entangled when they are located within the support bracket.

In accordance with a first exemplary embodiment of the present invention, the improved cable support is comprised of a first bracket portion which may be secured to an adjacent wall or ceiling support. In the preferred exemplary embodiment of the present invention, the bracket portion is secured by at least one and preferably more than one screws, nails or bolts that are fixed to an adjacent wall or ceiling support through one of the orifices that are preferably generally centrally located along the bracket support portion of the overall cable and/or wire support member.

In accordance with the preferred exemplary embodiment, a U or j-shaped member extends horizontally outward from this bracket support portion in order to provide a support for one or a plurality of cables and/or wires to be located within the bracket support. One end of the j-shaped member is spaced apart from the bracket to allow sufficient space for a user of the cable bracket to readily insert cables and/or wires within the space defined by the j-shaped member. Advantageously, in accordance with the preferred exemplary embodiment of the present invention, a further central support arm extends horizontally outward from the bracket portion of the cable support into a central region of the j-shaped member. This member essentially substantially bisects the central cavity formed by the U or J-shaped member.

This central support arm advantageously prevents individual cable members from becoming entangled with one another when they are located within the cable support of the present invention. A further advantage of the preferred exemplary embodiment is that the central support arm adds support for the cables that are located within the j-shaped member while also separating the cables and/or wires. In an alternate configuration, the central support arm extends from a central portion of the base in parallel with the remaining arms of the j-shaped portion of the cable support in order to provide the desired separation between adjacent cable members located within the cable support of the present invention.

Additionally, in accordance with a further aspect of the invention disclosed in the preferred exemplary embodiment a locking tab member extends from the bracket support portion of the cable support which has sufficient flexibility to seal the space between the end of the U or j-shaped member and the bracket support, thereby securing each of the cable members within the cable support. Those skilled in the art will appreciate that this element is unnecessary, especially when only a limited member of cables and/or wires are located within the cable support of the present invention.

In accordance with the preferred, exemplary embodiment of the present invention, the cable support member of the present invention is advantageously stamp formed from metal, such as, for example, 14 gauge galvanized steel. The stamp forming allows the steel to be readily shaped into the desired configuration. Advantageously, stamp forming allows rapid manufacture of many cable support members in a very short period of time. Additionally, this form of manufacturing these devices is preferred due to the limited expense of this process.

Those skilled in the art will appreciate that other manufacturing processes and types of materials maybe utilized as well for manufacturing the cable and/or wire support members of the present invention. For example, the parts of the present invention may be formed from other types of metals as well as plastics, fiberglass or any other suitable material with sufficient structural characteristics for supporting wires and/or cables. As noted, these devices may be stamp formed from a unitary body of material. Alternatively, individual components or portions of the overall product may be separately formed and combined into a single structure.

DETAILED DESCRIPTION OF THE INVENTION

Figure 1:
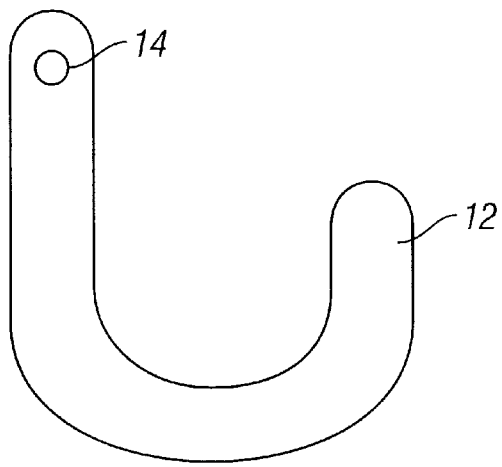
FIG. 1 is a side view of a prior art support bracket.
Figure 2:
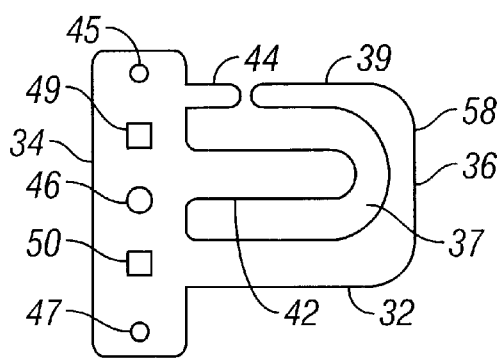
FIG. 2 is a side view of an embodiment of the present invention.

FIG. 2 is a side view of one alternate preferred exemplary embodiment of the present invention that is shown generally at 30. As shown in FIG. 2, the wire and/or cable support member 32 of the present invention is comprised of an attachment support 34 that has a support arm 36 which extends horizontally outward from a lower portion of the attachment support member 34. The support arm 36 has a vertical component 38 and a further horizontal component 39 which turns back toward the attachment support 34. This configuration of the attachment support 34 and support arm 36 and its separate portions provides a cavity 37 within which one or more wires and/or cables may be located.

In accordance with a preferred exemplary embodiment of the present invention a central support arm 42 extends outward from the vertical attachment support 34 to essentially bisect the cavity formed by the support arm 36. In the preferred exemplary embodiment of the present invention the central support arm 42 advantageously provides support for cables and/or wires that are secured by the overall bracket 32. Additionally, the central support arm 42 serves to separate the various cables and/or wires located in the support bracket. This configuration of the preferred exemplary embodiment can be readily stamp formed from 14 gauge galvanized steel, for example, as noted above.

The preferred exemplary embodiment of the present invention also includes a locking arm 44 that may be temporarily secured to completely or substantially enclose the cavity formed in the bracket. When the overall device is stamp formed from metal, the metal should be of suitable thickness to allow the locking member 44 to be simply bent into place. This locking arm member 44 may also be stamp formed simultaneously with the overall bracket. In accordance with the preferred exemplary embodiment this member is a simple metal that extends from an upper portion of the attachment support 34.

In accordance with the preferred exemplary embodiment of the present invention the attachment support portion 34 desirably includes one or more openings 45, 46, 47 through which one or more screws, bolts or nails may be driven to secure the bracket support to an adjacent wall and/or ceiling support. The openings 45, 46, 47 that are designed to receive screws, bolts or nails for securing the overall bracket are preferably circular in shape. The additional square openings 49, 50 in the attachment support 34 are designed to engage tab members in an overall bracket support that it is designed to support multiple cable support members 32 as described herein below.

Figure 3:
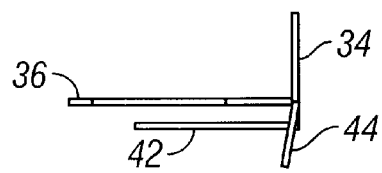
FIG. 3 is a top view of an embodiment of the present invention.

FIG. 3 is a top plan view of the overall support bracket which illustrates the preferred configuration where in the support arm 36 is offset from the central support arm 42 and the locking arm member 44 is a tab which extends from the attachment support 34. FIG. 3 also illustrates the orientation between the bracket attachment support member 34 and the cable support arm 36 wherein these members are oriented at a right angle to each other. Those skilled in the art will appreciate that an alternate configuration is also desirable such as that illustrated in FIG. 2 wherein a planar member is provided. The alternate configurations provide greater flexibility for users so that the support members may be readily secured to an adjacent wall or related support structure in a variety of different orientations. When a wall is the structure to which the support is to be mounted, the 90 degree orientation is most suitable. A planar configuration is more desirable when an internal wall support is the structure to which the bracket is to be secured. In such a situation, the support may be secured to be side of the internal wall support such that the cable support arm extends out away from the wall support.

Figure 4:
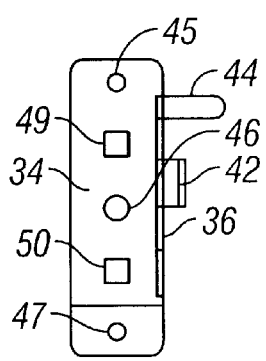
FIG. 4 is a front view of an alternative embodiment of the present invention.
Figure 5:
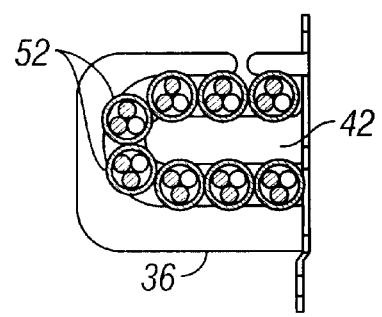
FIG. 5 is a side view of an embodiment of the present invention in use.

FIG. 4 is a side view that illustrates a preferred exemplary embodiment of the present invention wherein the vertical attachment support 34 and the openings 45, 46, 47 are formed at a 90 degree angle to the support and locking arms. This configuration of the overall cable and/or wire support member is suitable for providing support and offsetting cables from an adjacent wall. The configuration shown in FIG. 2 can be readily attached to an adjacent support surface when the adjacent support surface provides access for a substantially planar configuration. FIG. 5 is a side view that illustrates a plurality of armored cables 52 located within the cavity defined by the support arms of the overall bracket. Those skilled in the art will appreciate that various configurations for the present invention are possible and that a variety of materials are suitable for the formation of the bracket member 32. Furthermore, although it is preferred that a single piece of material the stamp formed in order to form the product, those skilled in the art will also appreciate that the cable support member product may actually be comprised of multiple members that are secured together through welding or which are otherwise secured into a single product having the configuration described herein.

As can be further seen from FIG. 5, the retaining space between the cable support portion 36 and the central support arm 42 prevents "bundling" of the cables and/or wires being supported. That is, the width of the retaining space is defined such that the wires and/or cables are held in the retaining space in a single file around the U-shaped retaining space, i.e., without stacking of multiple cables in the direction transverse to the U-shaped retaining space.

Although in the preferred exemplary embodiment of the present invention the central support member 42 extends from the attachment support member 34, in an alternate configuration the central support member 42 may also extend from the opposite side of the cable support arm 36. In such a configuration, it is preferred that the central support arm essentially substantially dissect the cavity defined by the attachment support 34 and the support arm 36.

Figure 6A:
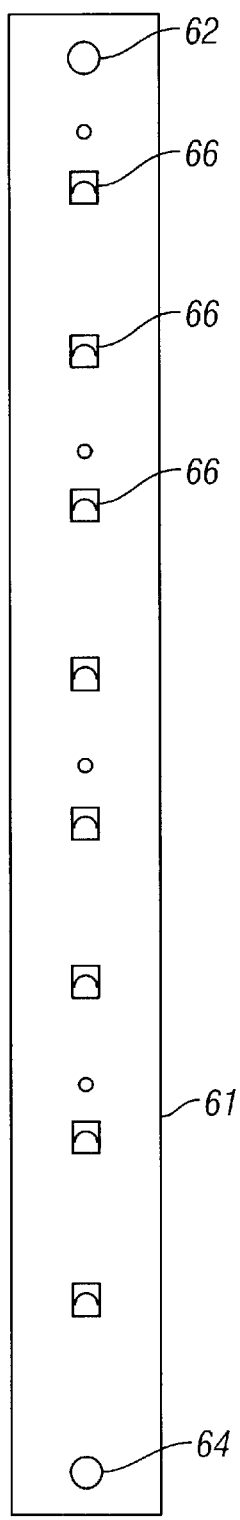
FIG. 6A depicts a bracket for supporting multiple embodiments of the present invention.
Figure 6B:
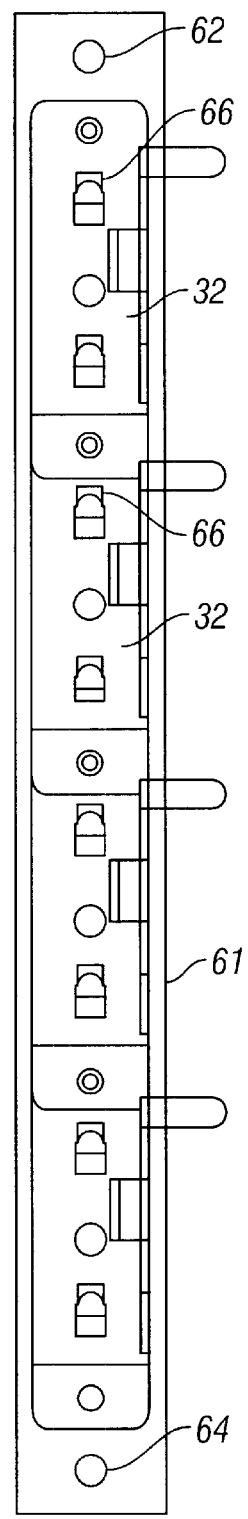
FIG. 6B is a front view of multiple embodiments of the present invention attached to the bracket of FIG. 6A.

FIG. 6 illustrates a multiple support bracket for securing multiple cable support members of the present invention that is shown generally at 60. As shown in FIG. 6A., the support bracket 61 is comprised of mounting holes 62, 64 that are preferably centrally located at the top and bottom portions of the overall bracket. Metal stamped protruding tabs 66 are also substantially centrally located and are spaced apart to engage corresponding square orifices in the bracket members. FIG. 6B illustrates the overall support bracket 61 with a plurality of cable support members 32 secured to the tab member 66. The overall bracket 61 provides a support that may be easily mounted for engaging and supporting multiple cable support members 32.

Figure 7:
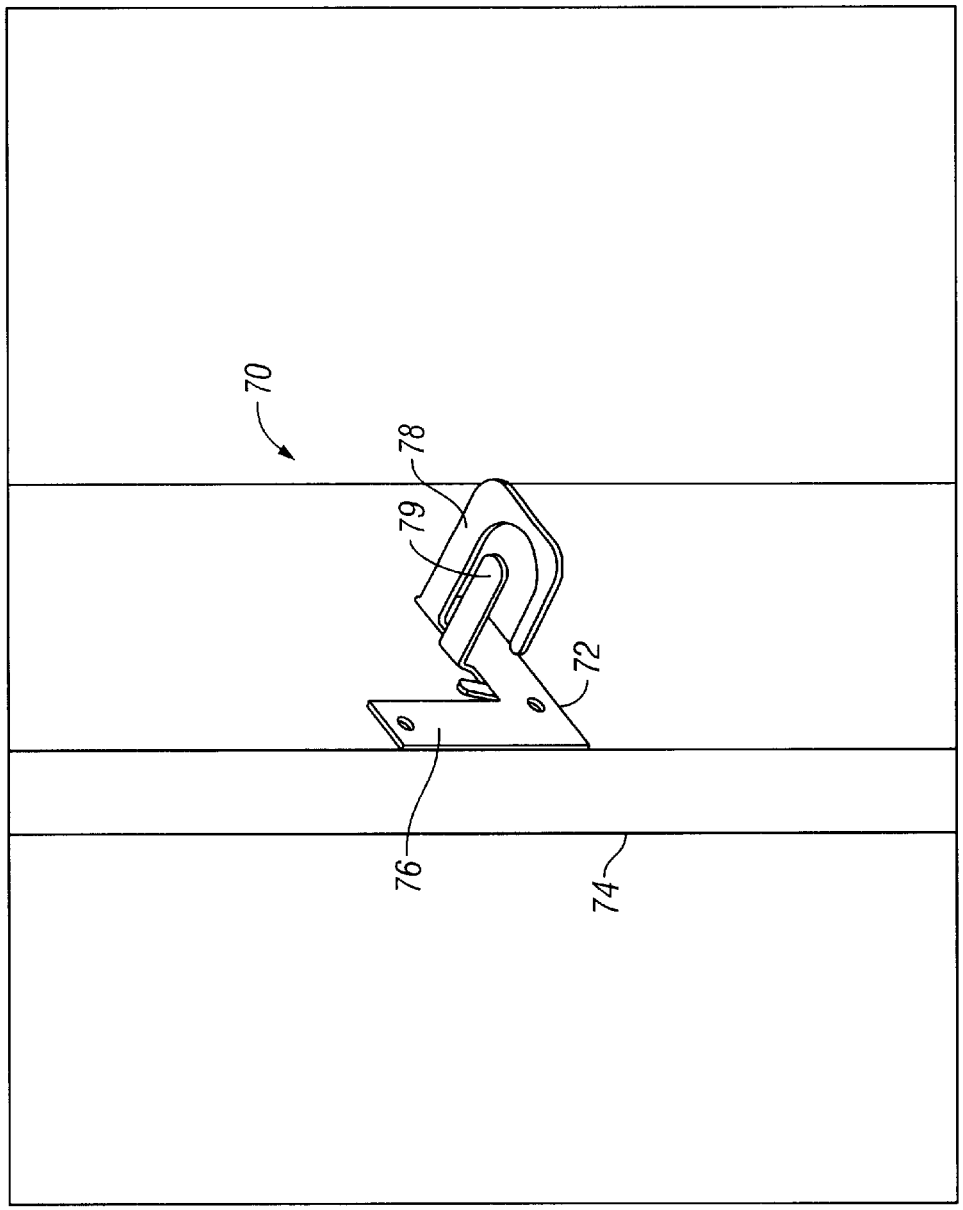
FIG. 7 is a perspective view of an embodiment of the present invention.

FIG. 7 illustrates a further exemplary embodiment of the present invention which is shown generally at 70. As shown in FIG. 7, this embodiment illustrates a vertical orientation of the cable support member 72 wherein the support 72 is used as a guide for maintaining a desired spatial relationship between a plurality of cables located therein. In this exemplary embodiment the cable support member 72 is mounted on a conventional stud member 74 that is typically used in construction. The stud member may be comprised of either wood or steel and provides a solid support for the cable support member 72.

The cable support member 72 is comprised of a pliable metallic or plastic material that allows portions to be bent as needed for insertion of cable members. The cable support member 72 is comprised of an upper portion 76 that is secured to the stud member 74. Those skilled in the art will appreciate that portion that is secured to the stud may also extend below those portions of the cable sport that are in contact with the cable members. The cable support member 72 is also comprised of a U-shaped member 78 and a peninsula 79 that extends into the U or J-shaped member. The space between the peninsula 79 and the U-shaped member is the intended location for the cables which have not been shown in this drawing for the sake of convenience. Those skilled in the art will also recognized that the peninsula and U-shaped member need not be arranged at a right angle to the surface of the stud.

What is claimed is:

1. A device for supporting wires and/or cables comprising:

an attachment portion;

a substantially planar cable support portion extending outward from the attachment portion, said cable support portion comprising a first support arm extending from and connected to the attachment portion, a curved portion, and an opposite support arm extending towards but separated from the attachment portion to define an opening, wherein said first support arm, curved portion and opposite support arm define a trough; and a substantially planar central support arm extending from the attachment portion into the trough to define a U-shaped retaining space between the cable support portion and central support arm, the U-shaped retaining space having a width defined as the perpendicular distance between the cable support portion and the central support arm;

wherein the width of the U-shaped retaining space is adapted to prevent bundling of the wires and/or cables being supported.

2. The device of claim 1, further comprising a locking member extending from the attachment portion into the opening.

3. The device of claim 1, wherein the device is a unitary body that is stamp formed.

4. The device of claim 3, wherein the device is comprised of steel.

5. The device of claim 1, wherein the device is a unitary body that is molded from plastic.

6. The device of claim 1, wherein the central support arm is not coplanar with the cable support portion.

7. The device of claim 1, wherein the central support arm is coplanar with the cable support portion.

8. The device of claim 1, wherein the attachment portion comprises a connection section and a support section at a right angle to the connection section.

9. The device of claim 8, wherein the cable support portion and central support arm extend from and are connected to the support section.

* * * * *